Feb. 25, 1936.  A. S. CHANDLER  2,032,259
RECEPTACLE FILLING AND SEALING MACHINE
Filed Sept. 2, 1933   7 Sheets-Sheet 1
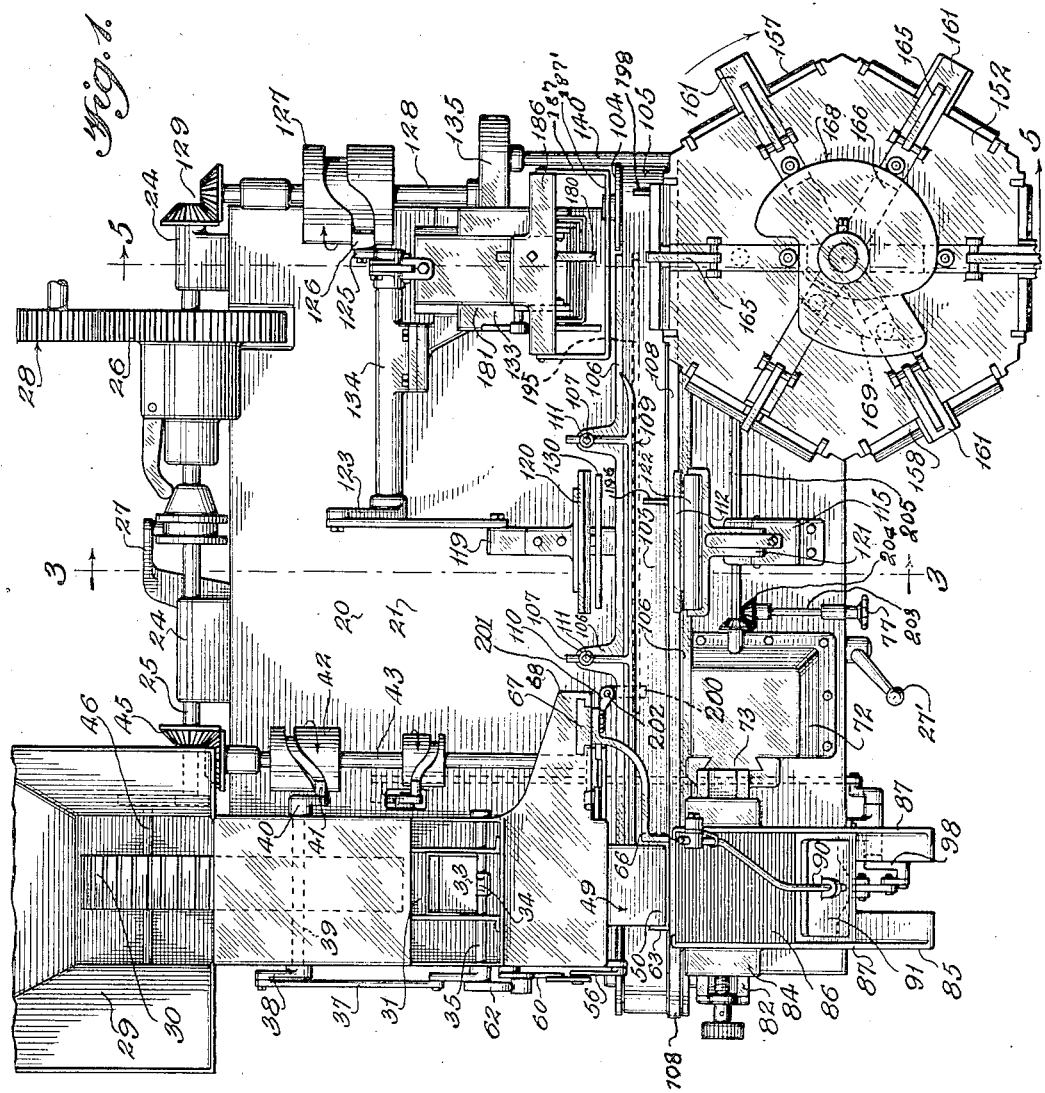
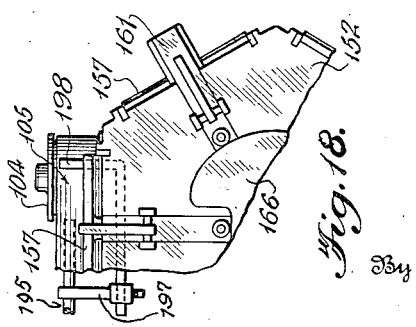
Inventor:
Austin S. Chandler.
By H. S. Woodward,
Attorney Feb. 25, 1936. A. S. CHANDLER 2,032,259

RECEPTACLE FILLING AND SEALING MACHINE

Filed Sept. 2, 1933 7 Sheets-Sheet 3

INVENTOR:
Austin S. Chandler.
BY H. S. Woodward,
ATTORNEY.

Feb. 25, 1936.  A. S. CHANDLER  2,032,259
RECEPTACLE FILLING AND SEALING MACHINE
Filed Sept. 2, 1933    7 Sheets-Sheet 4

INVENTOR:
Austin S. Chandler.
BY H. S. Woodward
ATTORNEY.

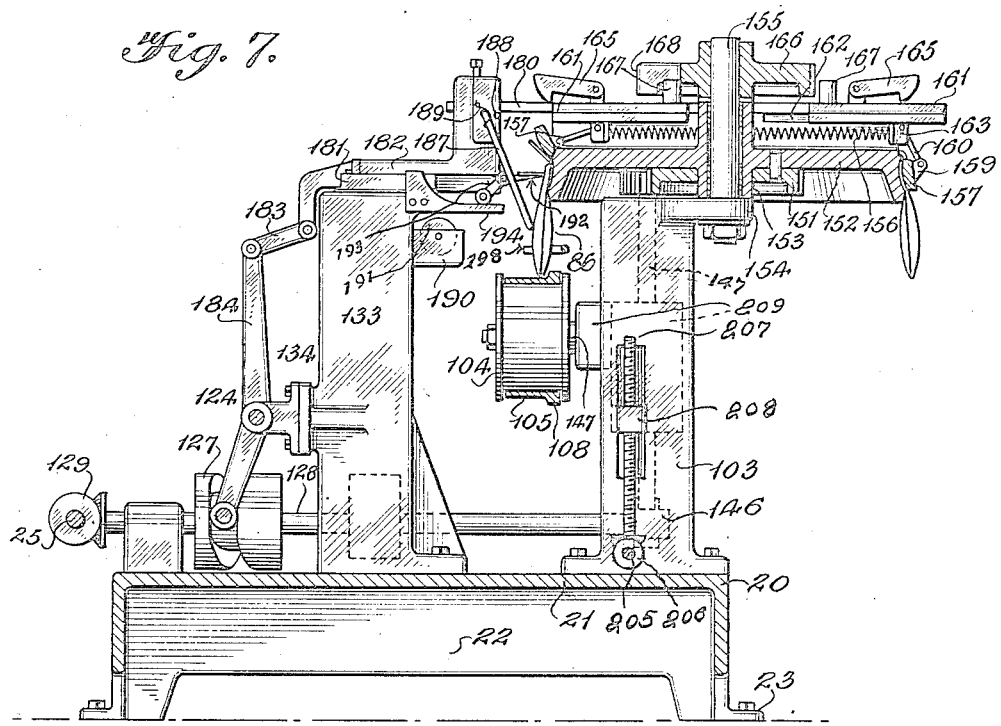
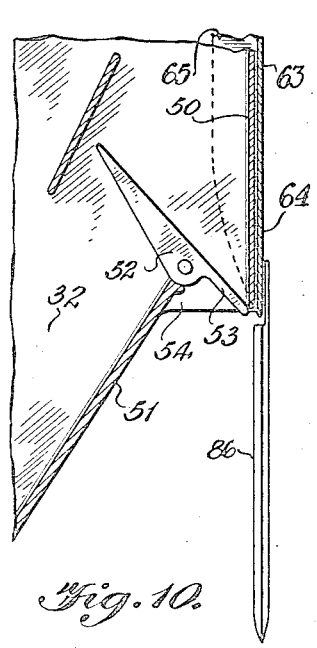
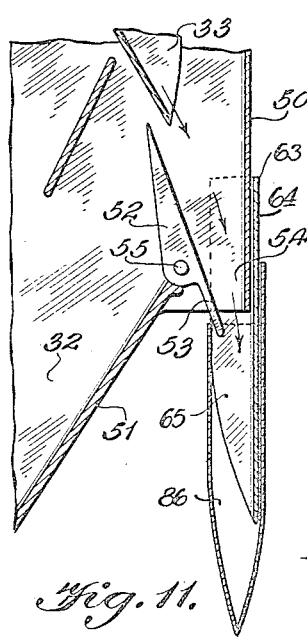
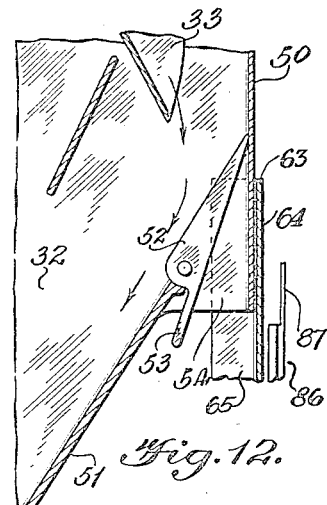

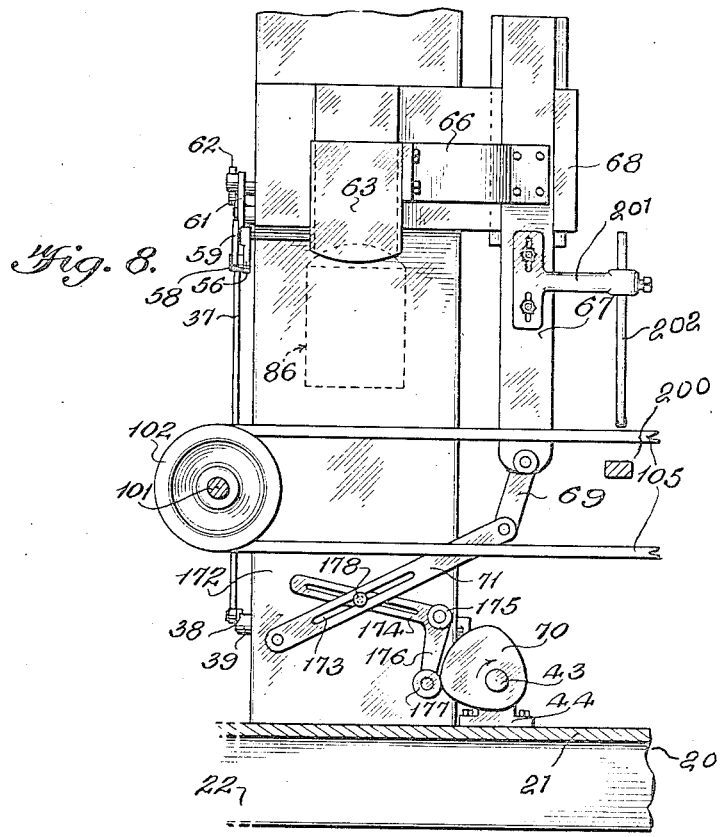
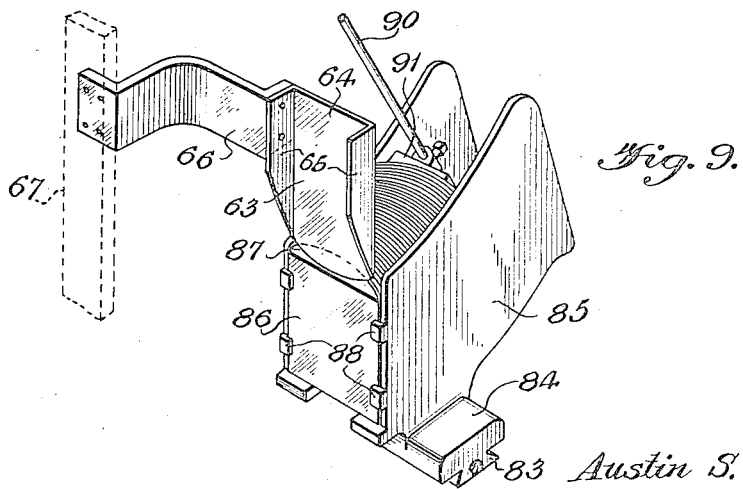

Feb. 25, 1936. A. S. CHANDLER 2,032,259
RECEPTACLE FILLING AND SEALING MACHINE
Filed Sept. 2, 1933 7 Sheets-Sheet 7
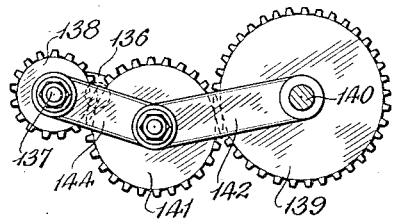
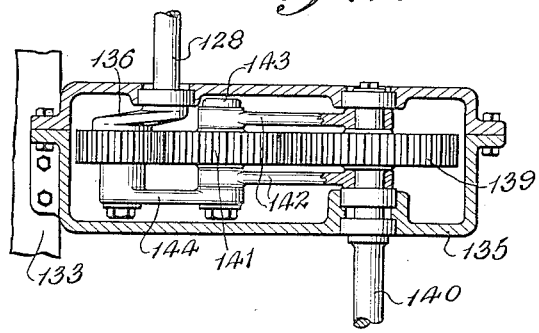
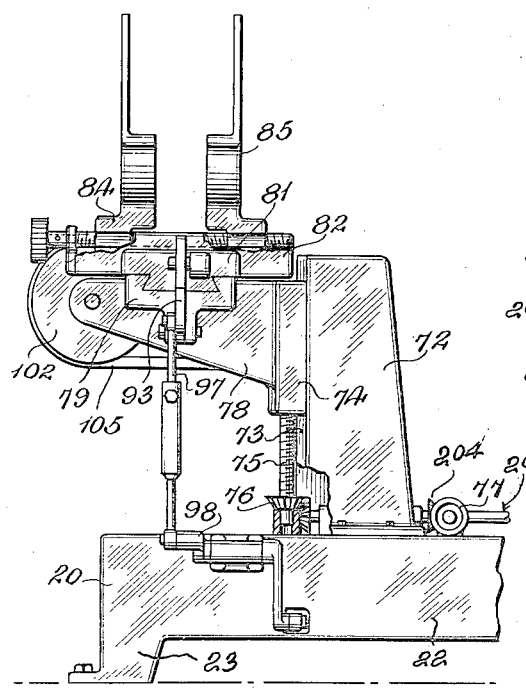
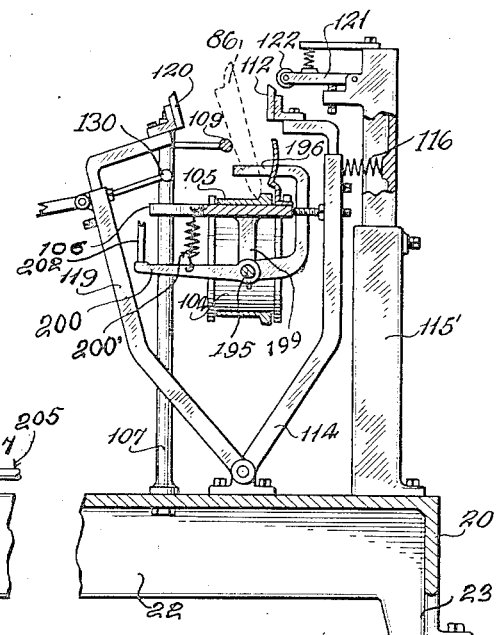
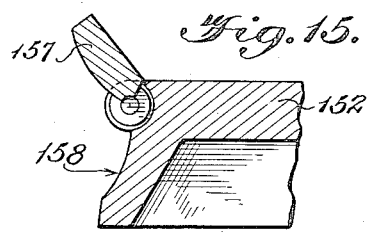
INVENTOR:
Austin S. Chandler,
BY H S Woodward
ATTORNEY.

Patented Feb. 25, 1936

2,032,259

UNITED STATES PATENT OFFICE 2,032,259

RECEPTACLE FILLING AND SEALING MACHINE

Austin S. Chandler, Fitchburg, Mass., assignor to The Brown Bag Filling Machine Company, Fitchburg, Mass., a corporation of Massachusetts Application September 2, 1933, Serial No. 688,048

13 Claims. (Cl. 226—49)

The invention relates to packaging machines, and while its mechanism is applicable to use with various receptacles it is here represented as applied particularly to a flat bag filling machine.

It is an important aim of the invention to present novel mechanism operative to measure accurately a charge of granular or fluid material, discharge it into a receptacle automatically presented to receive the charge, close and seal the receptacle and discharge the completed package conveniently for bundling or packing in a case.

It is an important aim to develop such a machine which will be extremely simple in construction and in which the several operative parts are all readily accessible for adjustment or repair. One of the important attainments of the invention is the embodiment of such a machine in an extremely small space. It is also an advantage that the operative connection of the elements is extremely simple, and enables the tending of the machine by an operative having a minimum of mechanical training or operating experience.

An object of great importance also is to present such a machine which will be adaptable in a novel way to accommodate bags and other containers of different sizes without requiring substitution of parts. Another object is to enable the presentation, filling and conveyance of paper receptacles with a minimum liability of damaging or wrinkling the receptacles and also with a minimum liability of producing marks on the surfaces or scarring or smearing of the printing thereon.

It is also a purpose to evolve a means for conveying the containers that will not subject the goods to severe shocks.

A specific object is to present a novel charge guiding device to coact between the measure and the receptacles as presented to the end that the charges will be guided into the receptacles when opened, but will return the charge to the hopper of the machine in case the opener fails to properly engage a receptacle.

A novel attainment of the invention is an intermittent conveyor action for conducting filled containers so constructed and operated that no positive grip is required to effect rapid movement of filled receptacles from stage to stage without lagging of the packages and yet with prompt movement and stoppage at each stage without upsetting or other uncertainty.

A further important purpose is to present a novel construction in the bag presenting creasing and sealing devices.

An important advantage of the invention is that it may be mounted upon a table with complete clearance therebelow.

Additional objects, advantages and features of invention reside in the construction, arrangement and combination of parts in the embodiment of the invention as will appear from the following description and the accompanying drawings, wherein Figure 1 is a top view of the machine.

Figure 7 is a similar view to Figure 5 showing another stage of sealing action.

Figure 8 is a view of the bag opener and its operating connection as viewed from the front, with intervening parts broken away.

Figure 9 is a perspective view of the opener and bag chute.

Figure 10 is a detail section showing the initial position of the bag opener and the safety trap.

Figure 11 is a similar view showing the filling position of the parts.

Figure 12 is a similar view showing the trapping position of the parts, by which waste of the charge is prevented in case no bag is in position.

Figure 13 is a detail of the intermittent gearing by which the conveyor and turntable are operated.

Figure 14 is a top view thereof partly in section.

Figure 15 is a detail of the pivot of the sealing bar.

Figure 16 is a front view of the filling station.

Figure 17 is a detail of a modified creasing station with positive bag stop.

Figure 18 is a fragmentary top view of the turntable with positive bag stop.

Figure 2:
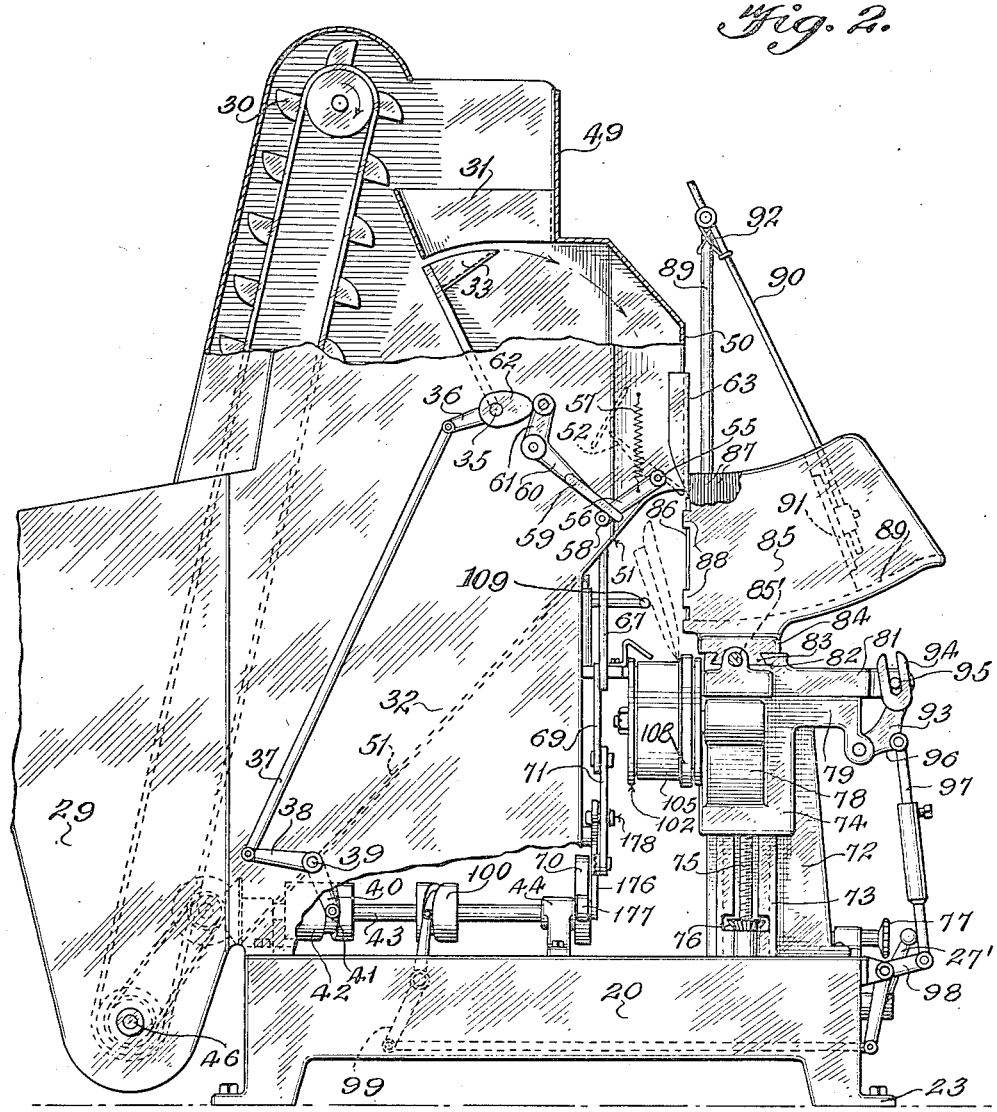
Figure 2 is a left end elevation with parts broken away.

There is illustrated a machine comprising a table frame 20, the top plate 21 of which is formed with reinforcing flanges 22 at the edges, and foot pieces 23 at the corners, so that the machine may be set upon an ordinary table or bench, although other methods of support may be employed if desired. The plate 21 is rectangular, and the rear flange 22 is provided with bearing brackets 24 in which a main shaft 25 is revolubly mounted, on which there is revoluble a driven gear and clutch assembly 26 adapted to be connected and disconnected from the shaft by the yoke 27 operated by a hand lever 27' at the front of the machine. A power gear 28 operated from any suitable source drives the clutch gear 26. At the rear and left hand side of the table a low level receiving hopper 29 is erected from which a cased bucket conveyor 30 lifts stock to a suitably elevated point of discharge above a small hopper 31 within the side plates 32 of the casing of the conveyor, which are extended forwardly at their lower parts a distance and utilized as a mounting for the measure and trap devices and the bag opener, as will be described. Beneath the hopper 31 there is reciprocable a measure and charge carrier 33 arranged to receive from the hopper 31 and mounted on an oscillating arm 34 carried by a rock shaft 35. This shaft is rotatably mounted in the plates 32. It projects at the left and is provided with a fixed arm 36 connected by a link 37 with an arm 38 on a counter rock shaft 39 at the lower part of the plates 32. This counter shaft projects at the right and is provided with a downwardly extending arm 40 having a wiper 41 engaged in a groove cam 42 of a rotary shaft 43 mounted in bracket bearings 44 closely over the plate 21 at right angles to the main shaft and driven therefrom by bevel gears 45 near the hopper 29. The shaft 25 is extended further toward the hopper 29 and has a sprocket drive to the lower shaft 46 of the conveyor 30.

The cam 42 operates the measure with a throw which carries it well forward and downwardly toward the front of the machine to deliver the charge, the plates 32 having an extended part 48 to form a measure chamber accommodating this movement of the measure. There is a front plate 49 between the plates 32 forming the front side of this chamber and also forming a cover for the extended parts, as in Figure 2. The extended portions and the front plate 49 have a vertical front part 50, the plate 49 stopping short at the lower edge of this vertical part, and the side plates being cut away abruptly to the rear so as to afford a clearway over a conveyor to be described. From a line parallel to and spaced close to a projection of the terminal part of the path of the measure (see Figs. 10–12) a diagonal hopper wall 51 is extended downwardly and rearwardly between the plates 32, terminating close above the lower part of the bucket conveyor and forming in effect a continuation of the bottom of the receiving hopper 29. A trap and bag holder 52 is pivotally mounted at the upper extremity of the wall 51, the trap consisting of a door-like plate having a thickened part pivoted on an axis in the plane of or parallel to the edge of the plate 51 with a short holder part or mouthpiece 53 arranged to extend across the opening 54 between the walls 51 and 50. The thickened part is longer than the part 53 and is tapered toward the opposite extremity of the trap plate in an extended V-shape, forming the trap proper as at 54, so that when this part is swung forwardly against the wall 50 the trap will be in charge diverting position and presents an inner or back face inclined downwardly and rearwardly, lying inwardly of the wall 51 at its lower or thickened part. When swung away from the wall 50 the trap forms with the wall 50 a funnel-like passage leading to the opening 54. The trap is operated in synchrony with the measure. It is fixed on a shaft 55 which is mounted revolubly in the plates 32 and projecting a distance through the left hand one, where it has an arm 56 fixed thereon without the hopper so extended and having a contractile spring 57 connected thereto so as to tend to move the trap to charge diverting position as described. The trap being in initial position as in Figure 10, the arm 56 extends downwardly and rearwardly, and the spring is anchored thereabove. A lateral wiper 58 is provided at the extremity of the arm engaged on the upper side by a long arm 59 of a bell crank lever 60 pivoted slightly above the level of the pivot of the trap. The short arm 61 of this lever extends upwardly and has a wiper bearing initially upon the high part of a cam 62 fixed on the shaft 35 of the measure. By this arrangement, when the measure is moved forwardly the low part of the cam permits the arm 59 to yield to the wiper 58 and the spring 57 moves the trap forwardly.

A bag opener and tunnnel 63 is provided at the front of the measure housing, consisting of a sheet steel plate having a flat front part 64 lying flat against the wall 50, the lateral edge portions 65 of the plate being bent rearwardly at right angles close beside the plates 32, so that the opener may slide vertically from a position above the lower edge of the wall 50 to bag engaging position well extended below the opening 54. The lower end edge of the middle portion 64 of the opener is trimmed on an inverted arc so that its central part projects as a bag-entering tongue while the adjacent edge portions of the sides 65 are trimmed on an incline so that they extend from the plane of the plate 54 upwardly and rearwardly. In this way they serve as wedges on entering a bag, to separate the front and back walls of the bag as will be understood. The opener 63 is attached to a rigid arm 66 which extends therefrom to the right, and is bent rearwardly and attached to a vertical slide 67 carried in a guide 68 beside the hopper at the right hand side of the hopper. The slide is operated by a link 69 from a cam 70 on the end of the shaft 43. The link is connected to the right hand end of a lever 71 pivoted a distance to the left of the shaft 43 on a plate 172 between the platen and between the plates 32. This lever is longitudinally slotted as at 173, and is crossed by the similarly slotted long arm 174 of a bell-crank lever 175 also pivoted on the plate 172, the last named lever having a downward arm 176 carrying a wiper 177 bearing on the left side of the cam 70. A pin 178 is adjustably secured in one slot and slidable in the other. By adjustment of the pin 178, the stroke of the opener may be regulated to various sizes of bags, in conjunction with the bag holder adjustment to be subsequently described. The opener is moved downwardly just before the measure reaches its forward and discharge position, so as to guide a charge from the opening 54 into a bag into which the opener has been projected.

On the frame 20, spaced forwardly from the plane of the plate 50 and to the right of the opener structure there is a pedestal 72 secured to the top of the top plate 21. Inwardly of this pedestal there is a transverse conveyor 105 to be described. On the left-hand side of the pedestal a vertical dovetail rib 73 is formed, on which there is slidable a carriage 74, resting upon a screw 75 operated by the gear nut 76 driven from a hand wheel 77 by suitable connections, by which the carriage is moved to desired positions in its vertical path.

At its upper part the carriage is formed with an arm 78 extending to the left, at the outer end of which there is formed a forward extension 79 and across the top of the carriage there is a dovetail channel 80 at right angles to the arm 78 and conveyor in which there is slidable a box slide 81 moved toward and away from the hopper by operating connections to be described. Upon the slide 81 there is formed a guide 82 transverse to the channel 80 (parallel to the conveyor) and having a dove-tail channel longitudinally thereof in which there are fitted corresponding ribs 83 formed on complementary bag box bases 84, which may be integral with respective box walls 85. They are adjustable in the channel by a hand screw 85' having right and left threads engaged in corresponding threaded openings in the box bases 84. The screw is held against longitudinal movement by a plate 85'' through which a tenon of the screw projects to receive the hand head 85-a at the left of the guide 82. This box is adapted to receive a multiplicity of stacked bags 86 and present them for engagement by the opener. Other means may be utilized for presenting receptacles, and various forms of receptacles may be employed, as will be understood. In the present instance, the bags 86 are flat paper receptacles each having an unfolded tongue 87 at the upper open end, and the back flaps or wall of the bag are of less altitude, as is familiar in this kind of bag. The bags are all arranged with the low sides toward the rear end of the box, and their open ends uppermost. The box is in fact a U-shaped trough or chute in halves with its bottom 89 curved longitudinally as a sector of a circle, the rear part of this bottom being horizontal and the bags thereon vertical and extending transversely between the two halves of the box. The top, the front and rear of this box are open, the rear or delivery end having on each of the side walls 85 inward of the vertical plane of the rearmost edge of the bottom 89, two or more inwardly projecting bag engaging lugs 88 which project slightly before the bags and engage against their extreme edge and back face portions so that they will not fall rearwardly from the box before being opened. A vertical standard 90 is mounted upon the box clear of the space for the envelopes, and adjacent the rear part of the box, a horizontal pivot pin being mounted at its upper part concentric with the bottom of the box. Pivoted upon this there is a swinging follower arm 91 and weight 91' the latter in the form of a flat plate adapted to lie flat against the outermost bag. The arm 91 may be spring pressed by a torque spring 92 at its pivot, or other means.

The bag box is reciprocated so as to be moved rearwardly to the position shown in full lines in Figures 1 and 2 by connections from the shaft 43 which operates the measure and the opener. At this position the upwardly extended tongues 87 of the bags are pressed against the lower extremity of the opener 63 (which is at the upper limit of its movement) and the low rear side of the bag caused to move slightly inward of the opener, so that the latter may readily enter the bag when the opener is moved downwardly. After downward movement of the opener the bag box is moved forwardly again. The reciprocating means for the bag box consists of a bell crank lever 93 pivoted on the extension 79 of the carriage, the upper end 94 of the lever being slotted to receive slidably a lateral pin 95 on the forward end of the slide 81, a short arm 96 of the lever having an extensible link 97 pivoted thereon and connected pivotally to the forwardly extending arm of a bell crank lever 98, pivoted on the front side of the frame 20, the lower arm of the last named lever being linked to an operating lever 99 near the rear part of the frame 20, the upper arm of which is provided with a wiper engaged in the slot of a cam 100 on the shaft 43.

The carriage 74 is provided at the left hand extremity of the arm 78 with a rearwardly projected bearing stud 101 on which a flanged conveyor pulley 102 is revoluble. By the latter construction and that preceding, in case it is desired to accommodate the machine to larger and deeper bags, the handwheel 77 is utilized to lower the carriage, so as to accommodate the upper ends of the bag to the opener, and the stroke of the latter may also be regulated as before indicated so that the various sizes of bags will be fully opened.

At the right hand end of the frame 20 there is a pedestal 103 on which there is mounted a driven pulley 104, receiving the conveyer belt 105 therearound, the belt being also engaged around the pulley 102 at the left end of the machine. The upper reach of the belt is supported by a horizontal plate 106, carried on standards 107 fixed in the top plate 21 of the frame rearwardly of the conveyer. It will be noted that the conveyer belt 105 is formed with a rib 108 at the front edge which may be either a separate belt driven in line with the belt 105 or may be integral therewith as shown. Spaced rearwardly of the rib 108 a suitable distance, and at a proper level thereabove to accommodate the filled bags, as will be explained, there is a horizontal guide rail 109 mounted on the standards 107 by arms 110 extended rearwardly from the rod 109 and slidable through suitable apertures in the standards 107. They are fixed in their adjustment by lock screws 111 engaged in the upper ends of the standards and adapted to bear against the arms 110. The pulley 104 is fixed upon a shaft 147 revoluble in a suitable bearing vertically slidable on the pedestal 103 and having an intermittent drive to be subsequently described.

The hopper first described, together with the bag opener and measure and the bag presenting means constitute a filling station with respect to the operation of the conveyer. The conveyer belt will be stationary at the time of release of the bags. The operation of the opener is such that in separating the front and back walls of the bags its lateral edges and bottom edge are drawn rearwardly so that they clear the lugs 88, leaving the bag free to slip downwardly from the opener as soon as released by the trap, and it will drop onto the belt 105. It will there rest with its bottom crease close to the rib 108. Its center of gravity and pressure of the bottom of the bag box against the upper part of the bag will cause the latter to fall rearwardly at the upper part until it leans against the guide rail 109. The conveyer belt operating means will then begin slowly to move the belt and accelerate it, decelerate and stop it with the filled bag at a creasing station a distance to the right of the filling station.

Figure 3:
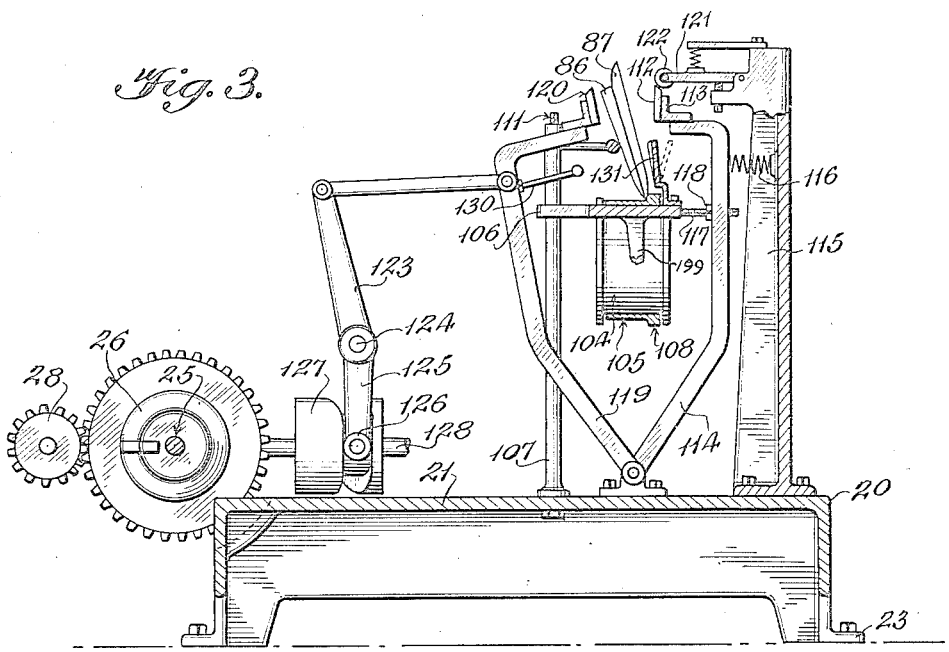
Figure 3 is a cross section on the line 3—3 of Figure 1.
Figure 4:
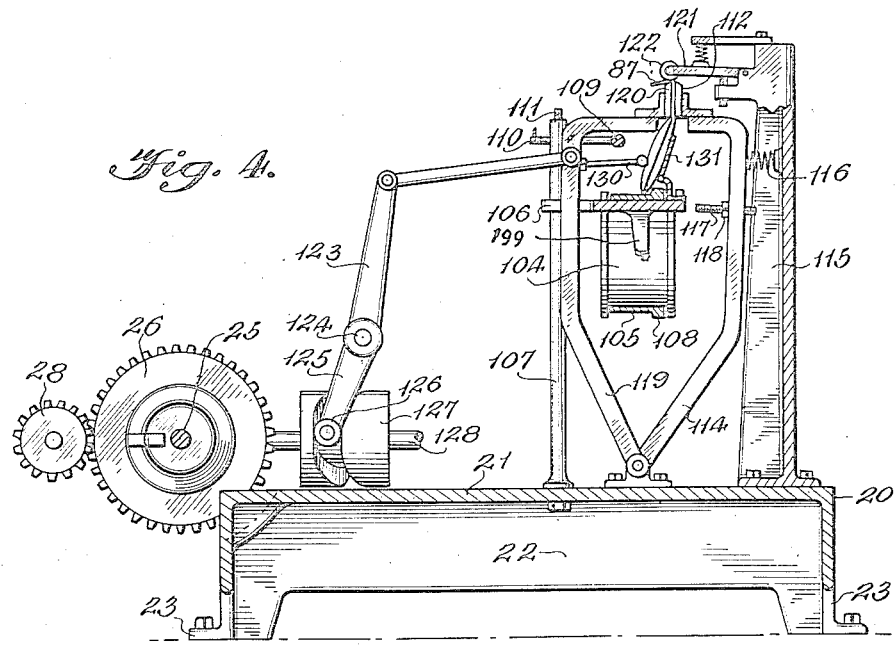
Figure 4 is a similar view showing the creasing action.

At the creasing station there is provided at the front side of the belt a spring-loaded anvil blade 112, the upper edge of which is bevelled to the front and located at the level at which the crease is desired on the bag to be operated on when the latter is upright on the belt. The blade is mounted removably on a cross member 113 at the upper end of an arm 114 pivoted on the plate 21 in the medial vertical plane of the conveyer and suitably offset in its intermediate portion to clear the conveyer and other parts therebeside. At the front of the frame 20 before the arm 114 a pillar 115 is erected, and a compression spring 116 is confined between the arm and the pillar which presses the arm rearwardly to an initial position or limit determined by a set screw 117 engaged through the arm against the plate 106 and secured in adjusted positions by a lock-nut 118. An arm 119 similar to the one 114 is mounted on the same pivot and arranged at the opposite side of the conveyer, carrying a presser blade 120 at the upper end opposed to the blade 112 and adapted to lie flat thereagainst with its rearwardly bevelled upper edge closely alined with the corresponding edge of the blade 112. On the pillar there is mounted a downwardly spring pressed pivot creaser arm 121 projected toward the anvil 112 and having at its outer end a transverse creasing roller 122 set with its lower part close against the blade 112 when in initial position and supported by a stop screw 122' so that it may readily ride over the blades. The arm 119 is held rearwardly of the path of the loaded bags resting against the rail 109 by its operating means and when a bag is stopped by the conveyer at the creasing station the arm 119 is pressed forwardly, engaging against the rear wall of the filled bag and moving the bag to erect position against the anvil blade. The spring 116 is of sufficient strength to cause the bag to be pressed quite flat between the blades before yielding, and then is pressed rearwardly under the roller 122, which presses the flaps 87 forwardly over the blade 120. If desired,—and this is customary practice with this invention—both blades may be below the top edge of the back wall of the bag, so that both walls are folded and creased, making a more secure closure. The operating means for the presser arm 119 consists of an upwardly extended arm 123 of a rock shaft 124 suitably mounted and extending to the right, where it has a lower arm 125 carrying a wiper 126 engaged in the groove of a cam 127 mounted on a cross shaft 128 driven by bevel gears 129 from the main shaft 25 at the right hand end of the frame 20. The arm 123 is linked to the upper end of the arm 119. The cam is timed and shaped so that the arm 119 is pressed forward and returned during the interval when the belt 105 is stationary. In this way a bag stopping at the creasing station is returned into the position shown in full lines in Figure 3 when the belt resumes movement after stopping—by the blade 112 in the initial return movement and by gravity and the plate 131 when the arm 114 is checked by the screw 117.

In order to insure proper shaping of the package during the creasing operation, the arm 119 is provided with a member 130 having a rod or padded extremity adapted to press against the body of the bag being creased, so as to hold the latter in properly erect position and form, and on the forward edge of the plate 106 a spring plate 131 is mounted at a proper position to receive the bag thereagainst, and prevent it from bending out of proper shape or failing to return toward initial position. This plate 131 is substantially erect initially, and yields to the filled bag while the latter is being creased. It is much wider than the bag, as are the blades 112 and 120, so that accurate positioning of the bag is not required and the plate may have a wing 132 at the departure side turned slightly forward toward the path of the conveyer so as to fend the upper part of a bag forwardly and so cause it to fall again against the rail 109 as it is carried toward the right hand side of the machine.

At the right hand end of the conveyer a gumming mechanism is provided, and an intermittent drive gearing therefor and for the conveyer 105.

As noted in Figure 1, the cross shaft 128 stops a distance forwardly of the cam 127, and rearwardly of the conveyer 105. A pedestal 133 is erected on the plate 121 of the frame, this pedestal carrying the shaft 124 in a rear bracket bearing 134, and having the forward end of the shaft 128 journalled at the right hand side in a housing 135 for an intermittent gearing. On the extremity of the shaft 128 in the housing a crank 136 is formed or secured, having a wrist stud 137 thereon in which is engaged an orbital driving gear 138 pinned or keyed so that it is fixed with the crank, the radius of this gear being the same as that of the stud 137. At a distance from the shaft 128 to clear the gear 138 and in the same plane with the latter there is a driven gear 139 keyed on a counter shaft 140 which is journalled in, and extends forwardly from, the casing 135. A swinging gear 141 is held in mesh with the gear 139 so that it may swing concentrically therewith, by links 142 hung on the shaft 140 and having engaged through their swinging ends a pintle 143 on which the swinging gear revolves. The pin projects beyond the link at the side adjacent the end of the wrist stud 137, and receives therearound an eye of a link 144 which has the outer end portion of the wrist stud bushed revolubly therein. The link 144 holds the gear 141 in mesh with the driving gear so that the drive will be transmitted from the driving to the driven gear at all times. However, as will be understood, at one part of the movement when the crank 136 is radial and extended outwardly with respect to the gear 141 no relative rotation will be imparted to the latter, and the driven gear will be stationary. From this point motion of the crank and orbital gear will move the gears 141 and 139 with accelerated motion to a maximum occurring when the crank is at or near its innermost position with respect to the gear 141, from which point the motion will be decelerated to zero again.

The shaft 140 is extended toward the front of the machine beyond the conveyer, and journalled in a suitable bearing at the right of the pedestal 103 which carries a turntable 150 to be described. A vertical shaft 145 is mounted within the pedestal 103, driven by worm gearing 146 from the end of the shaft 140 and is utilized to drive the shaft 147 carrying the right hand driven conveyer pulley 104, by means of bevel gears 148. At the upper end of the shaft 145 a simple pinion 149 is used to drive a large gear 151 on the turntable 150. The latter comprises a hexagonal plate 152 having a bored hub 153 on the circumference of which the gear 151 is keyed, and resting on a horizontal ear 154 extended toward the front and left, in which there is fixed a vertical stud shaft 155 bushed revolubly in the hub of the latter. The hub of the latter also extends upwardly from the body of the plate 152 affording seats for springs 156 by which sealer bars 157 are operated, as will be described. The plate 152 is flanged at the lower side to afford suitable vertical dimensions for the peripheral faces 158 which are horizontally rectilinear but are curved concavely from near the bottom to afford anvil surfaces against which the envelope and flap may be pressed by the sealer bars 157 pivoted at the upper edge of the plate 156 so as to swing into and fit the faces 158. This pivot axis is on the line of fold of the bag as nearly as possible. For this purpose, the plate is recessed to receive ears on the sealer bars 157 and the corners of the plate are suitably formed to permit the ready engagement of pintles through parts of the plate and the ears of the bars. Centrally of the back side of each bar 157 a short lug or arm 159 is formed on the bar on which is pivoted a short link 160 connected to a radial push bar 161 slidable in a guide 162 formed on the upper side of the plate 152. The link is connected to a lug 163 on the push bar which also serves as a seat for the outer end of a respective spring 156 by which the latch bar is moved to the outer limit of movement. On each side of the guides ears 164 are formed, between which there are pivoted latches 165 having bills on their under sides to engage the outer ends of respective bars 161 when retracted. The links 160 are of such length, and the bars 161 so spaced over the sealers 157 and arms 159 that the link approaches close to a dead center or a little short of right angles to the path of the bar 161 when the latter is at the outer limit of its movement checked by engagement of the bar 157 with the bag end. In this way a very effective high compression is obtained with a comparatively light spring 156. Additional means is provided however, to effect high pressure of the bag flap in sealing. This consists of a stationary cam 166 fixed on the stud shaft 155 over the turntable. Pins 167 are set on the upper sides of the push bars 161 to engage the periphery 168 of the cam, and to be engaged by an internal cam face 169. The face 168 is concentric with the axis of the turntable and has a rounded incident end. The under side of the cam is recessed to accommodate the pins 167, and on the side of the cam opposite the face 168 a dependent flange 169 is formed the inner face of which is spiral comprising an internal cam, its incident end being outwardly of the outer limit of movement of the pins 167 so as to engage the same and ward them inwardly, while the inner part or that of shortest radius lies inwardly of the inner limit of movement of the pins 167. Since the latches rest with their bills upon the bars 161, when the face 169 draws the pins 167 inwardly fully, the bills of the latches drop into retaining engagement with the ends of the bars and serve as detents. The latches are formed with faces 171 inclined upwardly from the bills to permit the release of the latches by inward pressure thereagainst of reciprocating release bars 180 to be described.

The pedestal 133 is formed across the top with a guide channel 181 at right angles to the conveyer, in which there is reciprocable a head 182 operated by a link connection 183 with an arm 184 extended upwardly from the shaft 124 at the right hand end. This channel is on the level with the lower part of the flanged edge or periphery of the turntable and the head 182 is formed with an upward extension 185 at its forward part in which there is extensibly fixed the release bar 180 positioned to aline with the adjacent push bar 161 and on a level therewith. The part 185 is formed with lateral extensions 186 parallel to the conveyor on the ends of which there are pivoted the ends of a substantially U-shaped spring-pressed bag holder 187, forward swinging movement of which is limited by a stop 188 on the part 186. The holder 187 is held yieldingly toward its forward limit by a spring 189. The bight portion 187' of the holder 187 is rectilinear and horizontal, and when the head 182 is retracted lies just rearwardly of the line of the rail 109 so that bags may slide from the rail onto the holder 187, and be moved toward the anvil faces of the turntable when the head 182 moves forward.

A glue box 190 is provided on the pedestal on the side next the conveyer, in which a roll 191 is revolubly mounted, and on the forward part of the head 182 there is pivoted a yielding glue bar 192 the end of which moves on such radius as to engage the roll 191 when the head is retracted and is spring-pressed toward the forward and upper limit of its movement limited by a wiper arm 193 thereon which projects rearwardly and has a wiper bearing down upon a cam plate 194 fixed on and projected forwardly from the pedestal below the head 182. This cam has a horizontal outer part of some extent adapted to limit the glue bar elevation through the final part of the forward movement of the head 182, and at the rear part the cam is curved upwardly, so that the wiper is fended upward and the glue bar swung downward to the roll 191 as the head 182 is retracted. The gumming apparatus is approximately the same distance from the creasing station that the latter is from the filling station.

It will be understood from the foregoing that by the operation of the intermittent gearing 135 the conveyer belt 105 and the turntable are operated simultaneously, the connections being so proportioned that the belt is moved a distance at each interval corresponding to the distance from the filling station to the creasing station and the unit movement of the turn-table being sufficient to bring succeeding sides thereof into opposition with the gumming device and stop it at each pause of the belt. The operation of the shafts 25, 43, and 128 is synchronized. The cam 100 is shaped and positioned so that the bag box is thrust inward while the bag opener is raised and the cam 70 is formed and positioned to then lower the opener, and the cam 43 will immediately then operate the measure and trap, as before indicated.

The initial movements of the opener and measure may occur while the belt 105 is in motion and decelerating. On this account, the rearward movement of the bag box 85 must have been completed, and may occur immediately after release of a filled bag. The purpose of the rearward movement of the box is to press the tongues 87 against the lower end of the plate 64, and the forward movement will relieve a filled bag of pressure from the stock in the box 85 so that it may drop freely, as well as insuring clearance of the bag from the box. The entry of the opener 63, however, will clear the edges and bottom of the bag from the box. As shown in Fig. 1, positioning of the box at rearward position while the filled bag is at loading position will insure its falling rearwardly at the upper part so as to lean against the rail 109, and return movement of the box at such time will move the bag to such position, or beyond a vertical plane at the bottom crease of the bag.

The cam 42 will release the trap and permit the filled bag to drop onto the conveyer belt while the latter is stationary and the opener 63 will be raised immediately thereafter. It should be noted that the body plate 64 of the opener 63 is in a vertical plane with the rib 108, and reciprocates in that plane, so that when the sides 65 have engaged within a bag at the open end of the box 85, the movement of the rear and outer wall of the bag by these sides 65 draws the side creases of the bag inward toward each other and also displaced them and the bottom crease rearwardly beyond the lugs 88, and to a plane rearwardly of the rib 108. Thereby, when the bag is filled and released, it falls with its bottom crease between the rib 108 and the vertical plane of the rail 109. The bag tends to fall also toward the rail 109 after engaging the belt so as to rest inclined against the rail, this being assured by engagement of the upper end of the bag by the box 85. Operation of the creasing apparatus occurs at the same time that the belt stops and quickly returns to initial position so that the creased bag will be in place for conveying when the movement of the belt begins again.

At the creasing station the operation of the presser blade 120 quickly presses the upper part of the bag under the roller 122 pressing the tongue of the bag rearwardly and forming a sharp crease by which the extremity of the bag is kept bent over as it is carried to the gumming and sealing device. At the latter station when the belt stops, the head 182 is moved quickly forward drawing the glue bar from the roll 191 and the cam 194 allows this bar to swing upward to maximum and move forward in that position against the envelope below the crease at the instant that the bar 180 lifts the latch 165 releasing the push bar 161 which operates the adjacent sealing bar 157. The bar 161 then is held by the end of the release bar, and as the head 182 moves back, the bar 161 follows, causing the sealer bar 157 to swing downward upon the adjacent inclined tongue of the bag, and a portion of the walls also, (the crease usually being a distance below the base of the tongue) swinging the parts so engaged against the body of the bag next the anvil face of the turn-table. The glue bar will have been drawn straight back after contacting the bag so that no glue is deposited below the folded tongue 87. The bag is now held clamped by the bar 157 against the anvil face 158. The turn-table is immediately rotated one stage as the belt begins to move, and the pin 167 of the respective push bar 161 immediately engages the rounded beginning of the concentric part 168 of the cam which presses it outwardly increasing the pressure on the sealing members 157 and retaining this pressure for three stages of movement of the turn-table, when the internal cam 167 engages the pin at the outer side and in two stages returns it to its inner limit permitting the latch thereadjacent to again engage the end of the push bar and hold it until it reaches the sealing station again and is released by the bar 180. The movement of the pin 167 against the internal cam 169 releases the sealed bag, which drops before reaching the table 21 while the turn-table is just beginning to move from its stationary stage and any desired receiver and holding or ordering device may be used in conjunction with this delivery.

If desired, the conveyor may be operated so as to move slightly further on each movement than the distance between stations, and a stop utilized across the path of the bags to positively stop them while the belt moves a little beneath them. The stop for the creaser station may be as shown in Figures 17 and 18, where a lever 196 is pivoted on a rock shaft 195 mounted in lugs 199 formed on the under side of the plate 106. To the left of the roll 104 the shaft stops and is provided with an arm 197 (Fig. 18) extended forwardly and upwardly and having an L-shaped finger bar 198 slidable transversely therein, which projects to the right and then rearward over the belt 105 at the departure side of the sealing station, as in Figures 1 and 18. The shaft 195 projects toward the left to a point in front of the vertical slide 67 carrying the bag opener (see Fig. 8) where it is provided with a rearwardly projected arm 200. The slide is provided with a bracket 201 in which there is vertically adjustable a push rod 202 arranged to bear upon the arm 200 when the slide 67 moves downward. The arm 196 extends from the shaft 195 toward the front of the machine, thence upwardly a distance from the belt 105, and thence inwardly over the belt, so that when the arm 200 is depressed the stop arm 196 will be in position to stop a filled bag on the conveyor belt 105. The arm 197 also projects forwardly from the shaft 195 and then upward, its upper end bored transversely (see Fig. 18). The finger bar 198 has a rectilinear long part slidable through the end of the arm 197 with means to secure it adjustably in various extended positions. Its extreme right hand end portion is extended rearwardly so as to lie over the belt 105 in approximately the same position relative thereto as the arm 196, when the arm 200 is depressed. Any suitable means may be employed to return the stops 196 and 198 to initial position clear of the receptacle path, a contractile spring 200' being shown for this purpose, connected between the arm 200 and plate 106.

Figure 5:
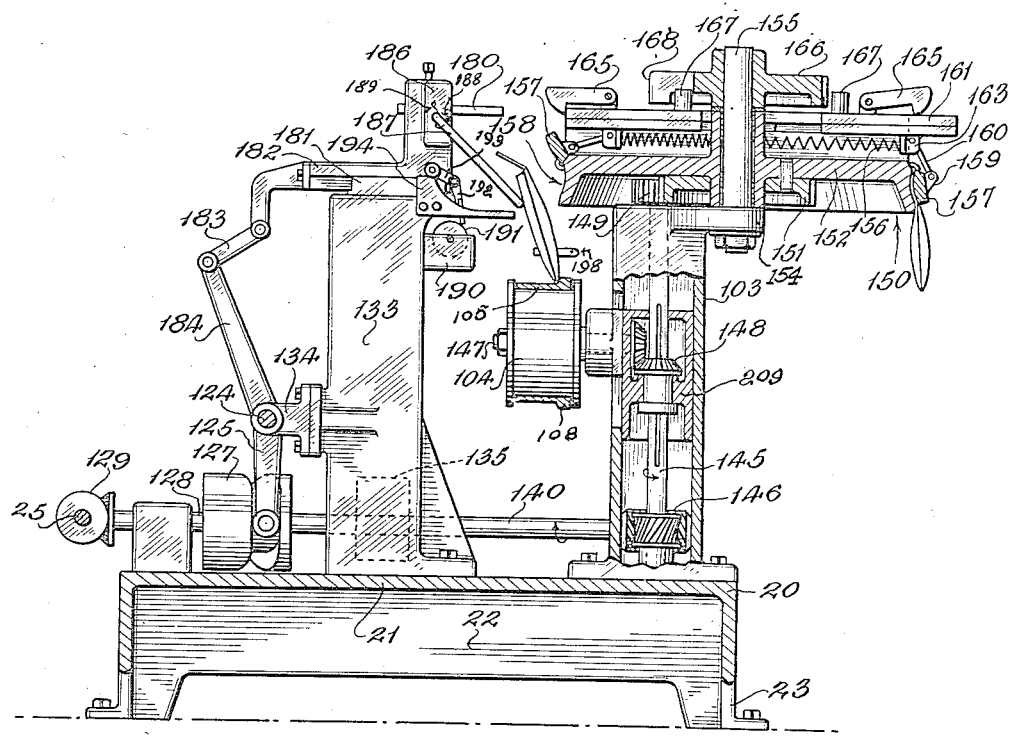
Figure 5 is a cross section on the line 5—5 of Figure 1, showing beginning of the sealing action.
Figure 6:
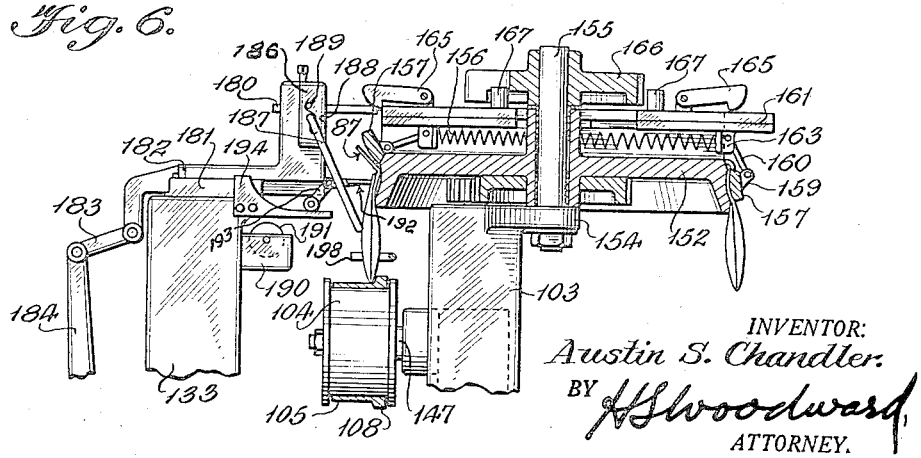
Figure 6 is a fragmentary section similar to Figure 5 showing the closing action in a further stage.

For the vertical adjustment of the conveyor 105 at both ends simultaneously, the hand wheel 77 turns a shaft 203, which extends rearwardly and has a bevel gear at its rear end meshed with a similar gear at 204 on a shaft 205, which extends both to left and right, and at the left end drives the screw 75 by bevel gears 76 as before described. The shaft 205 extends to the right to the pedestal 103 where by bevel gears 206 it drives a vertical screw 207 engaged in an arm 208 which is projected from a carriage 209 (Figs. 5 and 7) mounted for vertical sliding movement on the pedestal 103. The shaft 145 operating the turn-table extends through the carriage and the shaft 147 is mounted on the carriage 209, one of the gears 148 being slidably splined on the shaft 145.

I claim:

1. In a device of the character described, a loading station comprising a charge forming and discharge means arranged to discharge at a given location, a bag opener cooperative therewith and operative in a predetermined location with respect thereto, a bag presenting, conveying, scoring and sealing train associated with the charge forming and discharge means and bag opener, said train comprising an endless belt, a bag chute extending laterally therefrom open adjacent the belt, said belt having a supporting roller mounted on an axis fixed with respect to the level of the bag chute, means to support bags upright on the belt, a scoring means comprising a yieldingly mounted anvil member at one side of the path of the belt and a scorer blade at the other side of said path movable against the anvil and beyond a presser member in the path of the anvil and blade constructed to engage and ride thereover, means to operate the presser blade intermittently, and a gripping and sealing device in operative relation to the path of the belt operative to grip bags set upon the belt simultaneously with operation of the scorer blade; said loading station, said scoring and sealing elements being spaced uniformly along the path of the belt, and means to operate the belt intermittently to travel the distance of said spaces and stop for the period of the operations of loading, scoring and gripping, and means to operate the loading, scoring and gripping and sealing devices simultaneously.

2. In a machine of the character described, a charge forming machine including a charge carrier adapted to discharge at a given point under movement in a fixed path, a container box having an open side adjacent the point of discharge and container channel extending laterally from the said path, a multiplicity of erect flat folded open containers set in the box, means to press the containers toward said open side, the open side of the box having projections constructed to project before the edges of the first adjacent container, an opener reciprocable and shaped to enter the opening of the first container, to form an open receptacle in line with the path of the return charge carrier, and means to move the carrier to discharge position and return whereby it will throw a charge therefrom into the open container, said opener having parts divergent from the entrant end thereof and from the plane of the first container in the box, whereby to draw the container from the box, a mouth-piece at the side of said path opposite the box, adapted to enter the opening of the container and hold the same distended, and means to move the mouth piece into wedging and retaining engagement in the opening of the first container in advance of the charge carrier, and to withdraw the mouth-piece, and means to receive filled containers therebelow.

3. A charge forming and receptacle filling apparatus comprising a receptacle presenting device adapted to present receptacles in a given position, an opener reciprocable to enter presented receptacles, said opener having a channeled form, a charge carrier movable into the channel of the opener when engaged in a receptacle of the chute, a receptacle front side engaging gate pivoted beside the path of the carrier, adjacent the point of discharge and having a mounting for movement whereby one part is movable from a position above the opening downward within the open receptacle and laterally to frictionally engage the side of the receptacle opposite the opener, means to move the gate to inoperative position, yielding means to move the gate to engaging position, and means to move the carrier to discharge position between the gate and said opener.

4. The structure of claim 3 in which said gate has an extension in the form of a chute plate movable therewith to lie interposed in the path of the carrier in advance of discharge position to receive a charge when the gate element moves from inoperative position beyond receptacle-engaging position, and means to receive charges from said gate extension.

5. The structure of claim 3 in which said gate is a member pivoted on an axis parallel to the plane of the presented receptacles and opener, one part projected downwardly therefrom to swing from a position near the opener downward into an engaged receptacle and against the far side of such receptacle from the opener, and adapted to swing beyond such position if no receptacle edge is normally positioned in its path, and an upwardly extended part positioned and constructed to extend upwardly divergent from the opener when the gate is engaged with a receptacle normally to form a guide for charges from the carrier and to lie across the path of charges from the carrier when the gate is moved past normal engaging position with receptacles, operative connections for the elements named, and means to receive charges from the gate guide extension.

6. The structure of claim 3 including a hopper, having an extended part open at the lower side in which said carrier moves and through the lower part of which the carrier discharges, said gate being pivoted to swing against the front side of the extension as a closure in inoperative position.

7. The structure of claim 3 including a hopper, having an extended part open at the lower side in which said carrier moves and through the lower part of which the carrier discharges, said gate being pivoted to swing against the front side of the extension as a closure in inoperative position, said extension having a lower inclined part adjacent the pivot of the gate, said extension of the gate being shaped to deliver to said inclined part of the hopper material received thereon when in causal position.

8. The structure of claim 3 including a hopper, having an extended part open at the lower side in which said carrier moves and through the lower part of which the carrier discharges, said gate being pivoted to swing against the front side of the extension as a closure in inoperative position, said opener being a plate member slidable in close relation to the front side of said hopper extension and having sides conforming to the sides of the hopper extension and having inclined lower edge portions divergent from the plane of the said front side at their lower parts to form wedge elements for the purposes described.

9. A creasing device for machines of the character described, comprising a conveyor belt, a support parallel thereto above the level of the belt and being also spaced from a vertical plane medially of the belt, an anvil device laterally movable with respect to the belt spaced from said medial plane and having an upper angular edge portion at a level in predetermined relation to receptacles on the conveyor, a presser at the opposite side of the conveyor, a yieldable creaser adapted to ride over the anvil and presser when the latter two are moved relatively toward and past the creaser, and means to operate the presser for the purposes described.

10. In a device of the character described, an anvil adapted to have a flat bag top portion pressed thereagainst for creasing, and having a sloping top side terminating at the line of crease of a bag when engaged therewith, a presser of similar form movable to press a receptacle against the anvil, and a separately mounted yieldable presser roll positioned to ride on the anvil and over the presser by operation of the latter, for the purposes described.

11. A machine of the character described comprising an endless conveyor, a filling station, a creasing station and a gumming and sealing station, all equally spaced longitudinally of the conveyor, a bag supply, filling and depositing means at the filling station to deposit a bag inclined on the conveyor, means at one side of the conveyor to support a deposited bag when inclined thereagainst while moved by the conveyor, a creasing means comprising a yieldable anvil member at the side of the conveyor opposite the direction of leaning of the bag, a presser spaced from the path of the bag in the direction of leaning, means to operate the presser to engage and move the bag against the anvil beyond initial position of the anvil and return, a creasing member yieldingly mounted to engage upon the anvil and presser for the purposes described, an intermittent grip turn-table and gumming device constructed to gum the tongue of a bag and grip the same in closed position, and means to move the conveyor in travel stages from stationary position, accelerated and then decelerated to zero at a distance equal to the distance between successive said station.

12. In a bag filling machine, an uninterrupted smooth face conveyor belt having a continuous upstanding longitudinal rib thereon spaced from one side portion of the belt, a lateral support spaced above the belt spaced from the vertical projection of the rib toward said one side, a flat bag presenting means spaced above and adjacent the vertical projection of the rib, a bag filling means cooperative with said presenting means and including means to release filled bags bottoms down over the belt between the rib and lateral support whereby they will drop on to the belt in upstanding position, means to move dropped bags into leaning engagement with the lateral support, and means to operate the belt.

13. In a receptacle filling machine of the character described, a continuous-face smooth conveyor belt having a continuous upstanding rib longitudinally thereon at one side only, a lateral support spaced above the belt and spaced toward the opposite side of the belt from the vertical projection of said rib, a flat bag presenting means spaced above and adjacent the vertical projection of the rib, a bag opening and filling means cooperative with said presenting means and including means to release filled bags bottom down over the belt between the rib and said support whereby the filled bags will drop on the belt in upstanding position, means to move the dropped bags into leaning engagement with the said support, means spaced longitudinally from the filling means beside the belt for closing and sealing filled bags, means to move the belt step by step including a speed changing gearing constructed to initiate each movement very slowly from zero compared to prior practice and accelerate the belt movement gradually to maximum speed and then decelerate the movement very slowly compared to prior practice to stop the belt at the end of each step movement, and operative connections with the filling means and the closing and sealing means synchronized with the said gearing.

AUSTIN S. CHANDLER.